US012025790B2

United States Patent
Keller et al.

(10) Patent No.: US 12,025,790 B2
(45) Date of Patent: *Jul. 2, 2024

(54) MICRO-ELECTRO-MECHANICAL SYSTEM (MEMS) MICRO-MIRROR ARRAY (MMA) AND OFF-AXIS PARABOLA (OAP) STEERED ACTIVE SITUATIONAL AWARENESS SENSOR

(71) Applicant: Raytheon Company, Tewksbury, MA (US)

(72) Inventors: Sean D. Keller, Tucson, AZ (US); Gerald P. Uyeno, Tucson, AZ (US); Benn H. Gleason, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 570 days.

This patent is subject to a terminal disclaimer.

(21) Appl. No.: 17/177,755

(22) Filed: Feb. 17, 2021

(65) Prior Publication Data
US 2022/0260827 A1 Aug. 18, 2022

(51) Int. Cl.
*G02B 26/08* (2006.01)
*G01S 7/481* (2006.01)

(52) U.S. Cl.
CPC ........ *G02B 26/0833* (2013.01); *G01S 7/4817* (2013.01); *G01S 7/4813* (2013.01)

(58) Field of Classification Search
CPC .............. G02B 26/0841; G02B 6/3512; G02B 26/0833; G02B 26/101; G02B 6/3518;
(Continued)

(56) References Cited

U.S. PATENT DOCUMENTS 5,404,375 A  4/1995 Kroeger et al.
5,854,702 A  12/1998 Ishikawa et al.
(Continued)

FOREIGN PATENT DOCUMENTS

DE  102011104023.8 B4  7/2019
EP  2667142 A1  11/2013
(Continued)

OTHER PUBLICATIONS

"MEMS Mirror Array—Beam Steering Mode", [Online]. Retrieved from the Internet: <www.youtube.com/watch?v=wHIUU3kKtzM>, (Aug. 10, 2017), 2 pgs.
(Continued)

*Primary Examiner* — Elmito Breval
(74) *Attorney, Agent, or Firm* — Schwegman Lundberg & Woessner, P.A.

(57) ABSTRACT

An active situational sensor uses a Micro-Electro-Mechanical System (MEMS) Micro-Mirror Array (MMA) to steer an optical beam to different off-axis sections of a parabolic mirror, an "OAP", to re-direct and focus optical radiation into a spot-beam onto a conical shape of a fixed mirror, which redirects the spot-beam to scan a FOR. The sensor may rapidly scan a 360° horizontal FOR with a specified vertical FOR or any portion thereof, move discretely between multiple specific objects per frame, vary the dwell time on an object or compensate for other external factors to tailor the scan to a particular application or changing conditions in real-time. The MEMS MMA may be configurable to shape the spot-beam to adjust size, focus or intensity profile or to produce deviations in the wavefront of the spot-beam to compensate for path length differences or atmospheric distortion. The MEMS MMA being configurable to produce and independently steer a plurality of spot-beams of the same or different wavelengths.

20 Claims, 16 Drawing Sheets

(58) Field of Classification Search
CPC ............ B81B 3/0062; B81B 2203/053; H04B 10/1123; H04B 10/118; H04B 10/29; H04B 10/40; H04B 10/50; H04B 10/66; H04Q 2011/003; H04Q 2011/0039

See application file for complete search history.

(56) References Cited

U.S. PATENT DOCUMENTS

| | | |
|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B1 | 1/2018 | LeMaster et al. |
| 9,904,081 B2 | 2/2018 | Uyeno et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 11,333,879 B2 | 5/2022 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2012/0168605 A1 | 7/2012 | Milanovic |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1 | 1/2016 | Pezzaniti et al. |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0066320 A1 | 2/2019 | Uyeno et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |
| 2022/0236383 A1 | 7/2022 | Uyeno et al. |
| 2022/0260685 A1 | 8/2022 | Keller et al. |
| 2022/0350133 A1 | 11/2022 | Gleason et al. |

FOREIGN PATENT DOCUMENTS

| | | |
|---|---|---|
| EP | 2533003 B1 | 8/2018 |
| WO | WO-2014200581 A2 | 12/2014 |

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

"U.S. Appl. No. 16/871,602, Non Final Office Action dated Nov. 9, 2020", 18 pgs.

"U.S. Appl. No. 16/871,602, Notice of Allowance dated Feb. 24, 2021", 5 pgs.

"U.S. Appl. No. 16/871,602, Response filed Feb. 8, 2021 to Non Final Office Action dated Nov. 9, 2020", 12 pgs.

"U.S. Appl. No. 17/007,917, Non Final Office Action dated Aug. 3, 2021", 35 pgs.

"U.S. Appl. No. 17/007,917, Response filed Dec. 1, 2021 to Non Final Office Action dated Aug. 3, 2021", 16 pgs.

"High Contrast IR Wire Grid Polarizers", Edmund Optics, [Online]. Retrieved from the Internet: <URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kim, et al., "Demonstration of large-angle nonmechanical laser beam steering based on LC polymer polarization grating", Proc . . . of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 x 720 FPA development status at Raytheon Vision Systems", Proc. of SPIE vol. 6206 62060W-1, (2006), 16 pgs.

(56) References Cited

OTHER PUBLICATIONS

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

"U.S. Appl. No. 17/007,917, Notice of Allowance dated Jan. 10, 2022", 14 pgs.

"U.S. Appl. No. 17 007,917, Supplemental Notice of Allowability dated Apr. 19, 2022", 2 pgs.

MICRO-ELECTRO-MECHANICAL SYSTEM (MEMS) MICRO-MIRROR ARRAY (MMA) AND OFF-AXIS PARABOLA (OAP) STEERED ACTIVE SITUATIONAL AWARENESS SENSOR

BACKGROUND OF THE INVENTION

Field of the Invention

This invention relates to situational awareness sensors, and more particularly to the use of a Micro-Electro-Mechanical System (MEMS) Micro-Mirror Array (MMA) to steer a laser spot-beam over a sensor field-of-regard (FOR).

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collision avoidance, object targeting etc.

Situational awareness sensors may be passive or active. Passive sensors use a detector and ambient energy to detect and track objects in the sensor's FOR. Active sensors use a laser to illuminate objects in the FOR and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOR and a pixelated detector to detect reflected energy. This approach requires a laser with a lot of power, hence size, weight and cost, to provide the requisite power density over the FOR to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOR. The entire sensor may be pointed up and down to scan a desired vertical FOR. A single detector senses a reflected component of the spot-beam. This approach can use a less powerful laser and avoids atmospheric backscattering but is mechanically scanned.

Velodyne Lidar offers a suite of LIDAR sensors that provide a 360 degree horizontal FOR and a 30-40 degree vertical FOR for real-time autonomous navigation, 3D mobile mapping and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses many small emitter/detector pairs but requires mechanical rotation to scan the horizontal FOV.

U.S. Pat. No. 9,927,515 entitled "Liquid Crystal Waveguide Steered Active Situational Awareness Sensor" discloses the use of a liquid crystal waveguide to steer a spot-beam onto a conical shape of a fixed mirror, which redirects the spot-beam to scan a FOR. The sensor may rapidly scan a 360° horizontal FOR with a specified vertical FOR or any portion thereof, move discretely between multiple specific objects per frame in which information is read out from the detector on a frame-by-frame basis, vary the dwell time on an object or compensate for other external factors to tailor the scan to a particular application or changing real-time conditions.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an active situational awareness sensor that achieves SWaP-C and SNR improvements by scanning a spot-beam with no moving parts. The sensor may be positioned in any horizontal or vertical direction and may rapidly scan a 360° horizontal FOR in the plane (XY) perpendicular to the axis (Z) of the sensor with a specified vertical FOR perpendicular to the plane of the scan. More generally, the sensor scans a FOR, either serially or simultaneously, in a first angular direction around its optical axis and a second angular direction along its optical axis. The sensor may also scan any portion of the FOR, move between multiple discrete objects per frame, vary the dwell time on an object or compensate for other external factors to tailor the scan to a particular application or changing conditions in real-time. The sensor can be easily configured to address different wavelength bands without having to re-design the sensor material system or to recalibrate the steering commands. The sensor can generate, focus and independently steer one or more spot-beams spanning a diversity of wavelengths. The sensor can further shape the one or more spot-beams to adjust spot size, divergence/convergence, intensity profile, optical power, perform wavefront correction or maintain a zero phase difference across the beam.

In an embodiment, a situational awareness sensor comprises a parabolic mirror having a hole formed at its center. A laser (CW or pulsed) is configured to generate a beam of optical radiation that propagates along an axis of symmetry of the parabolic mirror and through the hole. A fixed mirror having a conical shape is positioned in front of the parabolic mirror with its axis of symmetry referred to herein as the "optical axis" suitably coincident with the axis of symmetry of the parabolic mirror but may be offset therefrom. A MEMS MMA is positioned between the parabolic mirror and the fixed mirror to receive the beam of optical radiation. The MEMS MMA, responsive to command signals from a controller, tips and tilts one or more mirrors to steer the beam onto different off-axis sections of the parabolic mirror, each section referred to as "off-axis parabola" or "OAP, which re-direct and focus the optical radiation into a spot-beam at different locations on the conical shape of the fixed mirror to steer the spot-beam about the optical axis and scan a FOR in a first angular direction around the optical axis. In an embodiment, the optical axis extends in the Z direction and the sensor scans the FOR in the first angular direction in the XY plane around the Z axis. A detector is configured to sense a reflected component of the spot-beam.

In an embodiment, each mirror can tip and tilt to steer the spot-beam axially along the conic shape of the fixed mirror to extend the FOR in a second angular direction along the optical axis (perpendicular to the XY plane). Using conventional terminology, the spot-beam is scanned in Azimuth around the optical axis and Elevation along the optical axis.

In one embodiment, each mirror rotates about X and Y axes to tip and tilt, and translates along a Z axis orthogonal to the XY plane to piston. In an implementation of the MEMS MMA, each mirror is supported at three vertices of an equilateral triangle. Lines defined by three different pairs of the vertices provide three axes at 60 degrees to one another in the XY plane, wherein each said mirror pivots about each said axes to produce tilt, tip and piston in the XYZ space.

In an embodiment, the MEMS MMA includes a plurality of mirrors that tip, tilt and piston to provide additional focusing of the spot-beam. The MMA may be used either to simply provide additional optical power to achieve a smaller spot on the fixed mirror or to adapt the optical power to maintain a uniform spot size as the beam is steered across different locations of the fixed mirror. In different embodiments, to focus the optical radiation into the spot-beam, the MEMS MMA may piston the mirrors to make small focus adjustments or tip, tilt and piston the mirrors to add optical power to supplement the OAP to make larger focus adjustments.

In an embodiment, the piston capability can be used to further shape the spot-beam to adjust size, intensity profile, to produce deviations in the wavefront of the spot-beam to compensate for path length differences or atmospheric distortion or to approximate continuous steering surfaces to reduce distortion.

In an embodiment, the MEMS MMA and OAP steer the spot-beam to a location Theta X and Theta Y from the optical axis onto the fixed mirror. Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis for an unfolded optical system in which the MEMS MMA is on the optical axis. Theta Z is the angle between the projection of the instantaneous location of the axis of the steered spot-beam and the Z axis. The conical shape of the fixed mirror redirects the spot-beam to a location Phi (the first angular direction) and Theta Z' (the second angular direction) where Phi is the angle between the projection of the instantaneous location of the axis of the redirected spot-beam on the X-Y plane and the X-axis and Theta Z' is the angle between the projection of the instantaneous location of the axis of the redirected spot-beam on the Z-axis. Theta Z' is greater than Theta Z. The redirected spot-beam scans a field-of-regard (FOR) defined by the values of Phi and Theta Z'. In certain standard conventions, the first angular direction Phi is also referred to as the Azimuth angle and the second angular direction Theta Z' is also referred to as the Elevation angle.

In different embodiments, the sensor may include different combinations of optical components L2 and L3. Optic L2 is configured to collimate the redirected spot-beam. Optic L3 is configured to direct the collimated redirected spot-beam through a discrete aperture. In an embodiment, N optical channels are spaced every 360/N degrees around the circumference of the conical shape. Each channel includes an Optic L2 and Optic L3 that guide the redirected spot-beam through a discrete aperture in a support member to scan 360/N degrees of the FOR.

The fixed mirror has a "conical shape", which is defined as "of, relating to, or shaped like a cone." A cone is defined as an axis perpendicular to a circular base, an apex located on the axis, and a surface that is the locus of straight lines from the apex to the perimeter of the circular base (C1). In different embodiments, the conical shape of the fixed mirror may be a cone (C1), a normal cone (CN1) in which the axis intersects the base in the center of the circle and the surface is rotationally symmetric about the axis, a piecewise linear (PWL) approximation of a cone C1 or CN1, a cone plus a powered optic (C2), PWL of a cone C1 or CN1 plus a powered optic (P2), a truncated cone (C3), a truncated PWL approximation of a cone (P3), a truncated cone plus a powered optic (C4), and a truncated PWL approximation of a cone plus a powered optic (P4). Any of the above conical shapes can be combined to create an acceptable conical shape for the fixed mirror (i.e. a polygon base with a curved surface formed by the locus of curved lines from the apex to the perimeter of the polygon base).

In an embodiment, the conical shape of the fixed mirror includes a curvature to expand the FOR along the optical axis e.g. in Theta Z'. This curvature also adds optical power. The MEMS MMA may be configured to tip, tilt and piston the mirrors to add optical power to the spot-beam to offset the optical power provided by the curvature.

In an embodiment, the controller issues command signals to steer the spot-beam in a circle around the conical shape and to vary the radius of the circle to move around the conical shape along the optical axis to scan a 360-degree region in Phi and a defined FOR in the X-Y plane (i.e., Theta Z'). If the conical shape is configured to reflect the spot-beam perpendicular to the optical axis, the beam scans a 360-degree horizontal FOR and a defined vertical FOR.

In an embodiment, the controller issues command signals to steer the spot-beam to discrete Theta X, and Theta Y to cause the redirected spot-beam to move from one object to another in the FOR. The response time of the MEMS MMA allows multiple objects to be illuminated per frame. The controller may issue the command signals to vary the dwell times on different objects. Furthermore, the MEMS MMA can be partitioned into segments to independently steer a plurality of spot-beams to simultaneously illuminate multiple objects In an embodiment, the controller issues command signals in an acquisition mode to scan a defined FOR to acquire objects and then issues command signals to move the spot-beam discretely from one object to the next to track the objects, suitably multiple objects per frame. The objects do not need to be tracked in sequential order, but can instead be tracked according to priority determined by the controller. Alternately, the MEMS MMA can be configured to scan a single beam in acquisition mode and then be partitioned to scan multiples spot-beams to simultaneously track multiple objects while the main scan is ongoing.

In an embodiment, an imaging detector is positioned behind the parabolic mirror along its axis of symmetry. The MEMS MMA tips, tilts and pistons a plurality of mirrors to approximate a continuous surface shaped of a convex mirror and forms a "central obscuration" of a passive imaging system. Passive optical radiation propagates around the central obscuration, reflects off the parabolic mirror (a "primary" mirror in an imaging system), reflects off the convex mirror (a "secondary" mirror in the imaging system) and propagates through the hole in the parabolic mirror to the imaging detector. Responsive to command signals, the MEMS MMA may control the tip, tilt and piston of the mirror to adapt the shape of the convex mirror to change the optical properties of the imaging system based, for example, on processing of the passive images. In an embodiment, the MEMS MMA operates in a scanning mode to scan the spot-beam around the fixed mirror to scan the FOR and in an imaging mode to image the scene. These modes may, for example, be multiplexed in time.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6A-6B are illustrations of an on-axis sensor in which the MEMS MMA steers the beam to different OAP sections of a parabolic mirror, which focuses the beam into a spot-beam on the conical shape of the fixed mirror to scan the FOR;

DETAILED DESCRIPTION OF THE INVENTION

The present invention provides an active situational sensor in which a Micro-Electro-Mechanical System (MEMS) Micro-Mirror Array (MMA) steers optical radiation onto different off-axis sections, OAPs, of a parabolic mirror to focus the optical radiation into a spot-beam and scan the spot-beam over a conical mirror to scan a FOR in first and second angular directions. The sensor may rapidly scan a 360° horizontal FOR with a specified vertical FOR or any portion thereof, move discretely between multiple specific objects per frame, vary the dwell time on an object or compensate for other external factors to tailor the scan to a particular application or changing real-time conditions. The axis of the sensor may be positioned in any horizontal or vertical direction and the sensor may rapidly scan a 360° FOR in the plane perpendicular to the axis of the sensor with a specified vertical FOR perpendicular to the plane of the scan. The plane perpendicular to the axis of the sensor is referred to as the "horizontal plane" in the remainder of this document, however, this plane does not have to be oriented horizontal (perpendicular to the direction of gravity), for the sensor to function. The sensor can be easily configured to address different wavelength bands without having to re-design the sensor material system or to recalibrate the steering commands. The sensor can generate, focus and independently steer one or more spot-beams spanning a diversity of wavelengths. The sensor can further shape the one or more spot-beams to adjust spot size, divergence/convergence, intensity profile, and optical power, reduce distortion or perform wavefront correction to compensate for atmospheric distortion or maintain a zero phase difference across the beam. The sensor can be used to provide object intensity or ranging in complex, dynamic systems such as aviation, air traffic control, ship navigation, unmanned ground vehicles, collision avoidance, object targeting etc.

Figure 1:
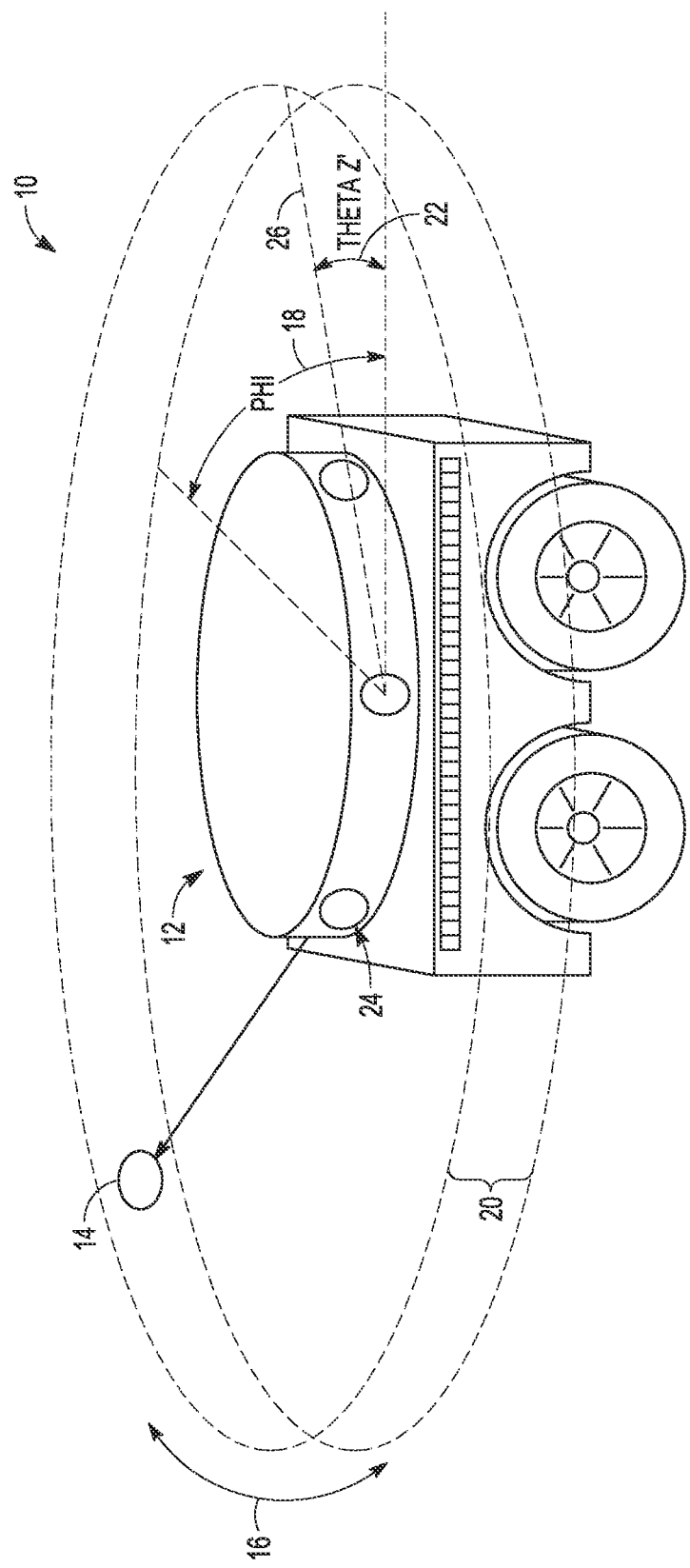
FIG. 1 is a diagram of an unmanned ground vehicle (UGV) provided with a MEMS MMA steered situational awareness sensor of the present invention.
Figure 2A:
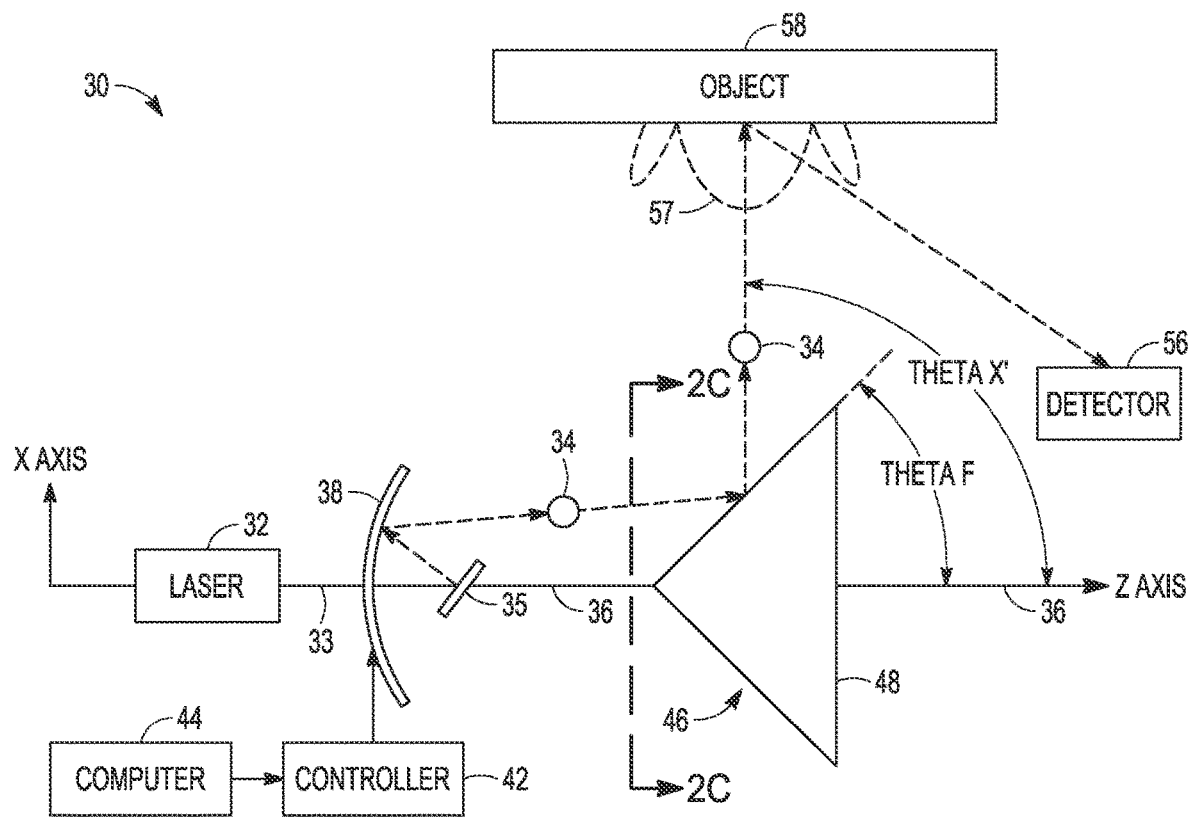
FIGS. 2A-2D are top, side, and section views of an embodiment of a MEMS MMA steered situational awareness sensor.
Figure 2B:
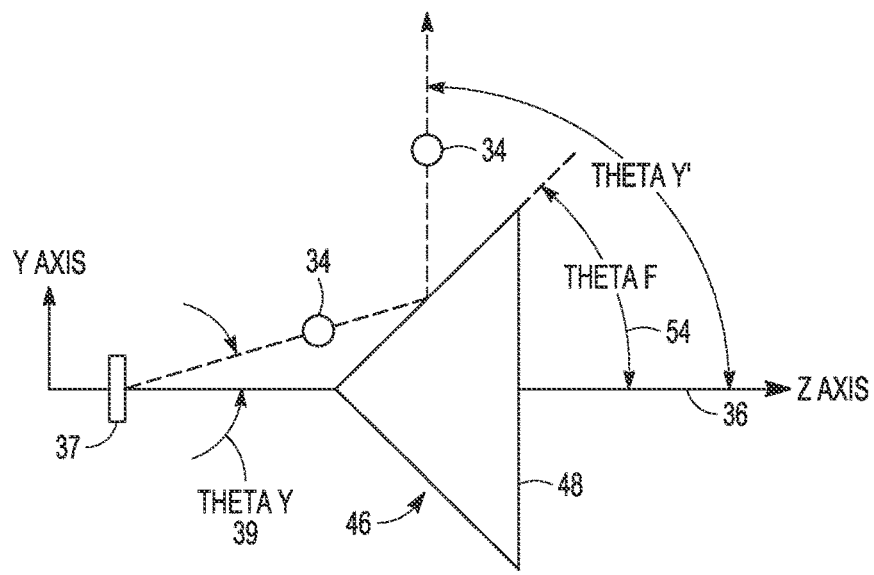
Figure 2C:
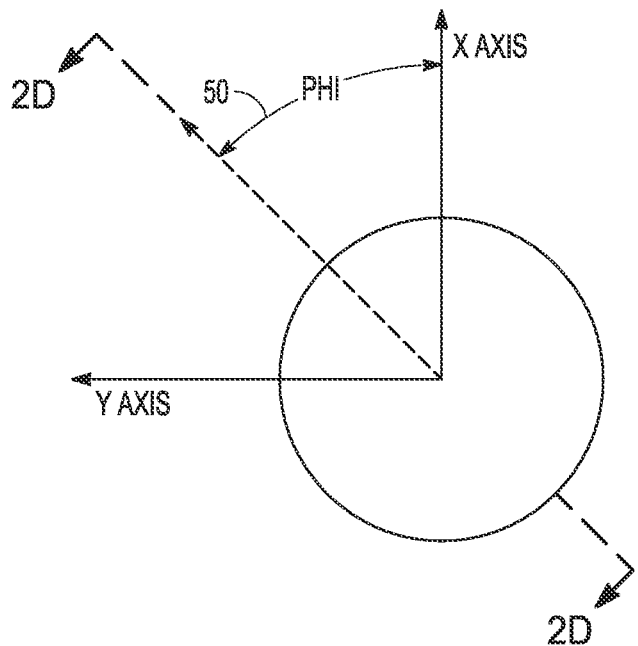
Figure 2D:
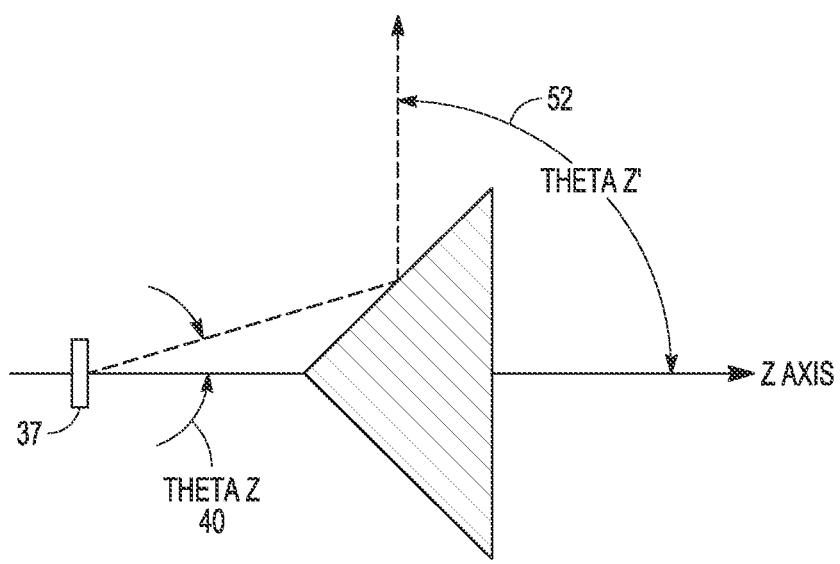

Referring now to FIG. 1, in an embodiment an unmanned ground vehicle (UGV) 10 is outfitted with an active situational awareness sensor 12. Sensor 12 is capable of scanning a spot-beam 14 over a 360° FOR 16 in angle Phi 18 and a defined FOR 20 in angle Theta Z' 22, typically 2 to 20 degrees. In a specific configuration, the FORs in angle Phi 18 and Theta Z' 22 correspond to horizontal and vertical FOR, respectively. In other embodiments, sensor 12 may be configured to scan a reduced FOR. For example, in some applications the sensor may need to only scan a forward 180° FOR. More simply, the sensor scans the spot-beam around the Z axis to scan a FOR (e.g. forward 180° or 360°) in the XY plane.

Sensor 12 comprises a laser, a parabolic mirror, a Micro-Electro-Mechanical System (MEMS) Micro-Mirror Array (MMA), a fixed mirror having a conic shape (or annuluar portion thereof), a controller, a computer, various optical components and a detector housed in a structural housing 24. One or more apertures 26 are formed in housing 24 to facilitate scanning spot-beam 14 over the FOR. To scan the 360° FOR 16, the housing may have a single continuous ring aperture or multiple discrete apertures placed every 360/N degrees.

The laser (CW or pulsed) is configured to generate a beam of optical radiation that passes through a hole in the center of the parabolic mirror onto the MEMS MMA. The MEMS MMA is oriented to nominally re-direct the beam back towards the parabolic mirror and is responsive to command signals from the controller to direct the beam to a particular off-axis section (OAP) of the parabolic mirror to focus the optical radiation and steer spot-beam 14 about the optical axis in two dimensions on the surface of the fixed mirror. The conical shape of the fixed mirror is oriented along the optical axis and redirects the spot-beam 14 to a location Phi and Theta Z' in the FOR. The various optical components are configured, at least in part, based on the particular aperture configuration of the sensor to scan the spot-beam 14 over the FOR. The detector is suitably a non-imaging detector configured to sense a reflected component of the spot-beam, which can be processed to provide intensity or range.

The combination of the parabolic mirror, MEMS MMA and fixed mirror having a conical shape to focus and steer and redirect a laser spot-beam provides many advantages over known active situational awareness sensors. The SWaP-C benefits of using a single laser to produce a spot-beam over a 360 degree FOR without rotary scanning systems are considerable. The use of a scanned spot-beam significantly reduces atmospheric backscatter, thus improving SNR. Whereas the rotary scanned sensors are limited to continuously scanning the same 360° horizontal FOR over and over, the MEMS MMA steered sensor may rapidly scan a 360° horizontal FOR with a specified vertical FOR or any portion thereof, move discretely between multiple specific objects per frame, vary the dwell time on an object or compensate for other external factors to tailor the scan to a particular application or changing real-time conditions. Furthermore, by moving the primary focusing responsibilities to the parabolic mirror, this approach allows the dynamic range of the mirror actuation to be allocated to the task of steering and possibly shaping the beam.

Figure 5A:
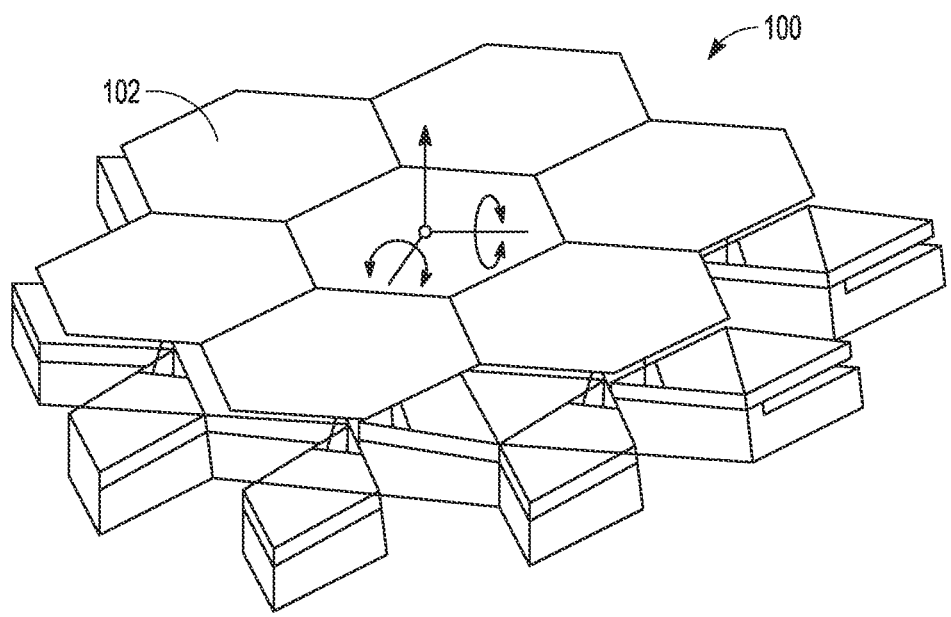
FIGS. 5A-5B are illustrations of a known embodiment of a Tip/Tilt/Piston ("TTP") MEMS MMA and a single mirror actuated to tip, tilt and piston.
Figure 5B:
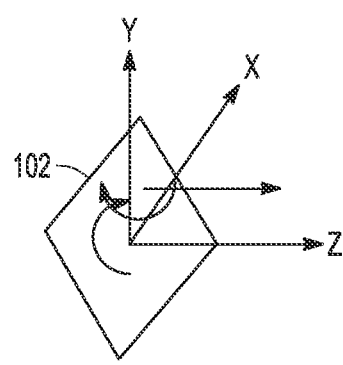

As best shown in FIGS. 5A-5B, a Micro-Electro-Mechanical System (MEMS) Micro-Mirror Array (MMA) 100 comprises a plurality of independently and continuously controllable mirrors 102 to re-direct optical radiation to focus and steer the optical beam(s). Each mirror is capable of at least "Tip" (rotation about an X-axis), "Tilt" (rotation about a Y-axis and "Piston" (translation along a Z-axis, perpendicular to the XY plane) where the X, Y and Z are orthogonal axes in a three-dimensional space. The Piston capability can be used generically speaking to "shape" the beam(s) that are reflected off of the MEMS MMA.

With a plurality of mirrors, the piston capability can be used to perform beam shaping functions such as to adjust the size, divergence or intensity profile of the spot-beam, produce deviations in the wavefront of the beam to compensate for atmospheric distortions, adjust phase to maintain a zero phase difference across the beam, add optical power to further focus the beam or to improve the formation and steering of the beam by approximating a continuous surface across the micro-mirrors, which reduces unwanted diffraction to increase power in the f optical beam.

The MEMS MMA is preferably capable of tipping and tilting over range of at least −15°×+15° to steer over a range of +/−30×30° and pistoning (translating) over a range of at least +/−15 microns (at least one-half wavelength in either direction) at a rate of at least 1 KHz (<1 millisecond). The independently controllable mirrors can be adaptively segmented to form any number of spot-beams, adjust the size/power of a given spot-beam, generate multi-spectral optical beams and to combine multiple input sources. Further, the MEMS MMA must have a sufficient number of mirrors, mirror size/resolution, fill factor, range of motion, response time, response accuracy and uniformity across the array.

Figure 3:
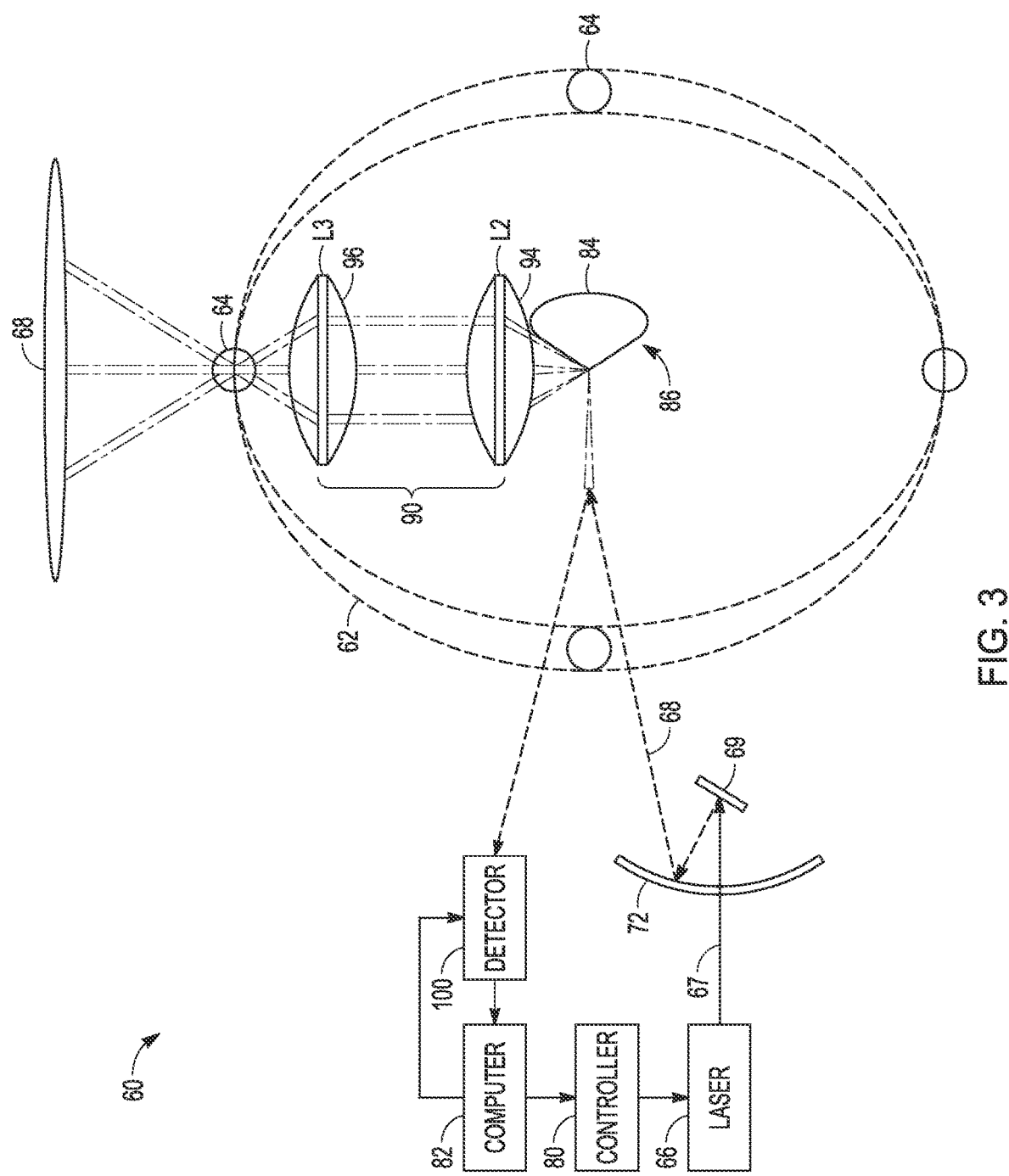
FIG. 3 is a diagram of another embodiment of a MEMS MMA steered situational awareness sensor including optics L2 and L3 for scanning the redirected spot-beam through discrete apertures.
Figure 4A:
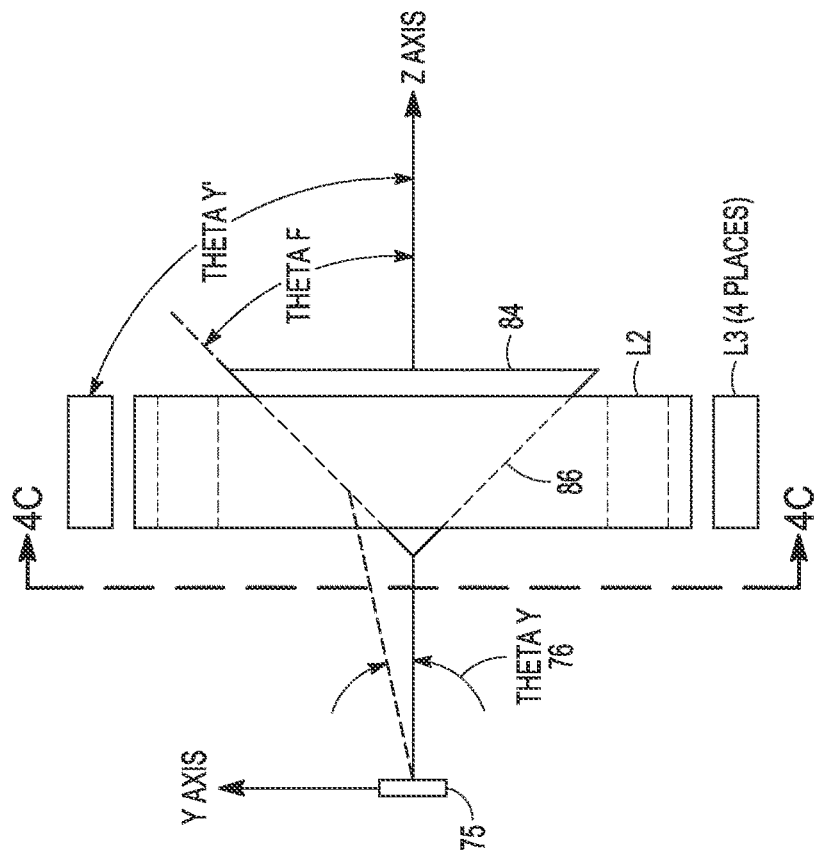
FIGS. 4A-4D are top, side, and section views of the situational awareness sensor of FIG. 3.
Figure 4B:
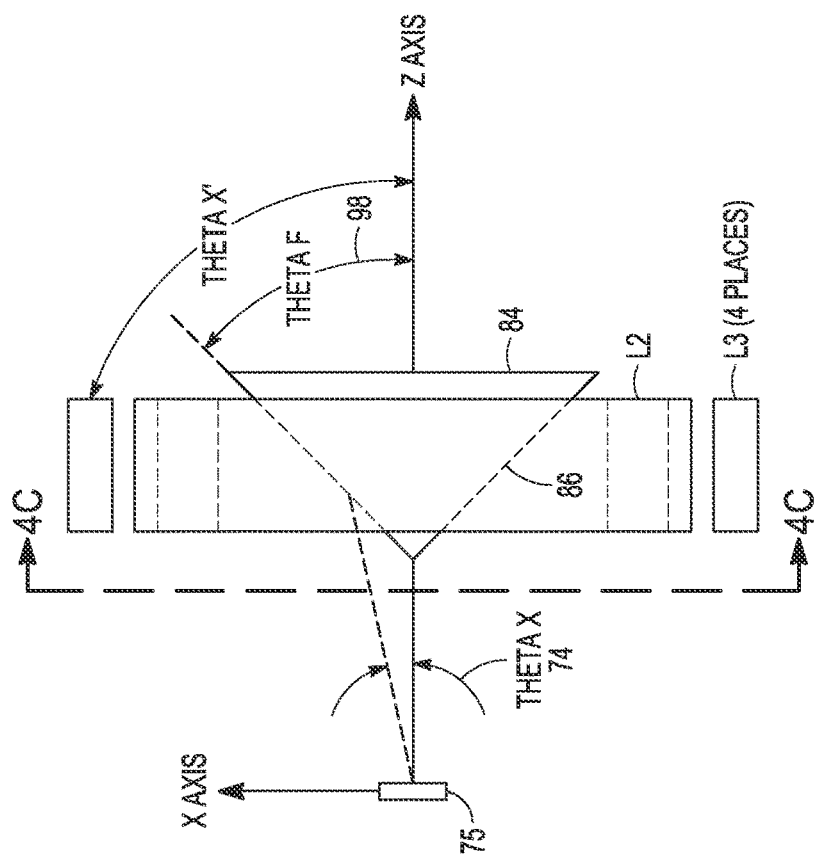
Figure 4C:
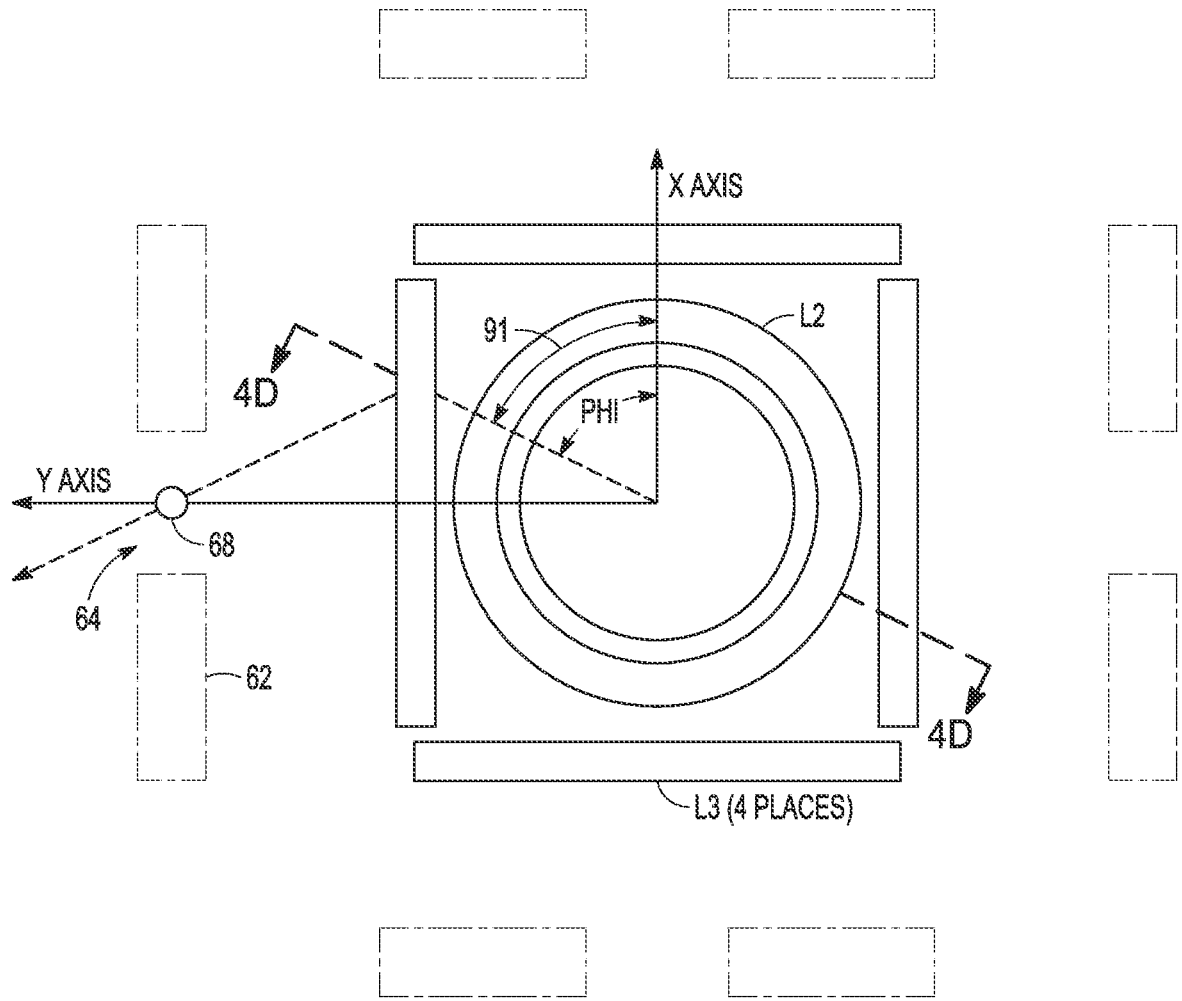
Figure 4D:
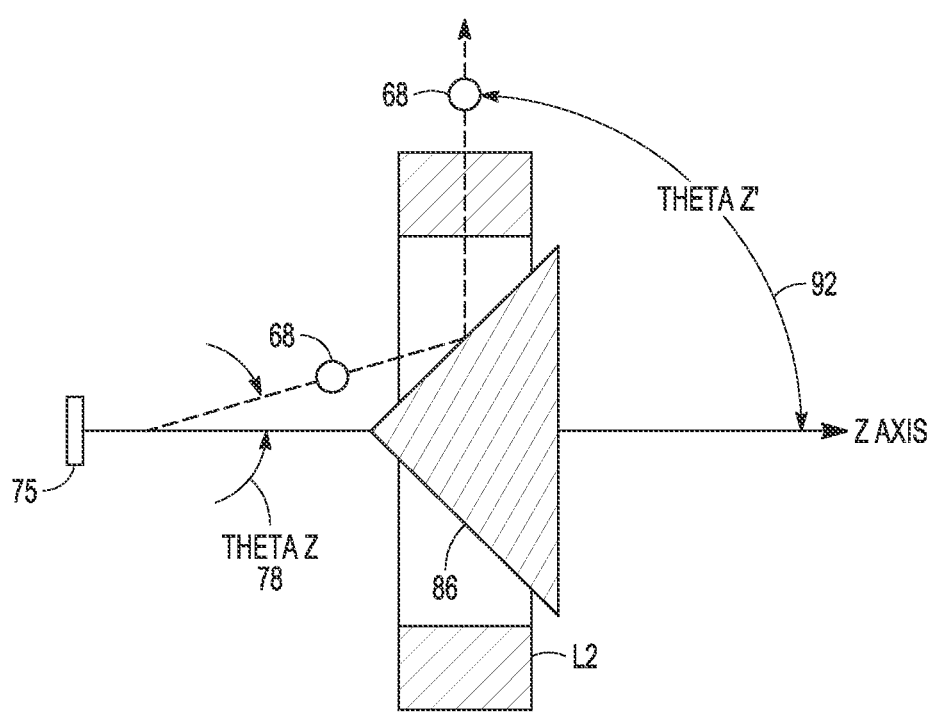

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points (or vertices) of an equilateral triangle. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

Referring now to FIGS. 2A through 2D, an embodiment of an active situational awareness sensor 30 comprises a laser 32 configured to generate a beam 33 of optical radiation that passes through a hole in the center of a parabolic mirror 38 and onto a MEMS MMA 35 that re-directs beam 33 back onto parabolic mirror 38. Parabolic mirror 38 is oriented to nominally re-direct optical radiation along an optical axis 36 in the Z direction. The MEMS MMA is responsive to command signals to re-direct the optical radiation onto a particular off-axis section, OPA, of the parabolic mirror 38 to focus and steer a spot-beam 34 about the optical axis to a location Theta X 37 and Theta Y 39 from the optical axis. Optical element 37 represents a combination of MEMS MMA 35 and parabolic mirror 38 in an unfolded optical system to illustrate the origin of the spot-beam 34 from the optical axis. In this particular configuration, the optical system is a "2f" system in which the origin of the source is 2f (two focal lengths) from the mirror, which in turn focus the optical radiation at 2f onto the cone. Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z 40 is the angle between the projection of the instantaneous location of the axis of the steered spot-beam and the Z-axis.

Because of the rotational symmetry, the position of the X-axis is, more or less, arbitrary. In this description, X is parallel to the "in plane" steering direction and Y is parallel to the "out of plane" steering direction. Making X parallel to the in plane steering direction simplifies the description, but it does not have to be in this location, there is a straightforward transform to relate any choice of X to the in plane steering direction.

A controller 42 is configured to issue command signals to the MEMS MMA 38 to steer the spot-beam 34 to the desired Theta X and Theta Y. A computer 44 is configured to issue signals to the controller 42 that provide the desired Theta X and Theta Y to implement a continuous scan, illumination of multiple discrete objects, variable dwell time, compensation for an external signal etc.

A fixed mirror 46 has a conical shape 48 oriented along the optical axis 36 (coincident with or offset from in different configurations) to redirect the spot-beam 34 to a location Phi 50 and Theta Z' 52 where Phi is the angle between the projection of the instantaneous location of the axis of the redirected spot-beam on the X-Y plane and the X-axis and Theta Z' is the angle between the projection of the instantaneous location of the axis of the redirected spot-beam and the Z-axis. Theta Z' 52 is greater than Theta Z 40. The redirected spot-beam 34 scans a FOR defined by the values of Phi and Theta Z'. Theta X is the angle between the projection of the instantaneous location of the axis of the redirected spot-beam on the X-Y plane and the Z-axis and Theta Y' is the angle between the instantaneous location of the axis of the redirected and the Z-axis.

Steering spot-beam 34 in a circle (i.e. a constant Theta Z) around the conical shape scans the redirected spot-beam 34 around a 360° FOR in Phi. Varying the deflection of the MMA so that light is incident on a different section of the parabolic mirror (or scanning a line along the cone) scans the redirected spot-beam 34 in a defined FOR in Theta Z'. The angle Theta F 54 of the conical shape 48 of fixed mirror 46 may or may not be configured such that the spot-beam 34 is redirected perpendicular to optical axis 36. When Theta F produces a Theta Z' perpendicular to the Z-axis, the situational awareness sensor has a two-dimensional band of coverage comprised of Phi and Theta Z' that is centered on the Z axis along with the fixed mirror 46. Increasing or decreasing Theta F increases or decreases the nominal Theta Z', respectively. This shifts the two-dimensional band of coverage comprised of Phi and Theta Z' along the Z axis.

The ability to control the redirection of the spot-beam allows the total FOR of the sensor to be optimized. For example, if the FOR is a volume on top of a flat surface the sensor can be placed near the surface and the spot-beam directed perpendicular to the optical axis to maximize the volume of the FOR. In a second example, if the FOR is a circularly shaped region (perimeter) on top of a flat surface, the sensor can be placed above the ground and the spot-beam directed down to scan the circularly shaped region of interest. In a third example, if the sensor is in the front of a moving vehicle, the sensor axis can be directed in the forward direction and the spot-beam directed up to scan the volume in front of the moving vehicle to detect objects in front of the vehicle.

A detector 56, suitably a non-imaging detector, is configured to sense a reflected component 57 of the spot-beam reflected from an object 58. The reflected component may be processed to provide an intensity of the illuminated object or a range to the illuminated object.

The fixed mirror 46 has a "conical shape" 48, which is defined as "of, relating to, or shaped like a cone." A cone is a three dimensional geometric shape described by a circular base, an axis perpendicular to a circular base, an apex located on the axis, and a surface that is the locus of straight lines from the apex to the perimeter of the circular base (C1). A "normal" cone (CN1) is a cone in which the axis intersects the base in the center of the circle and the surface is rotationally symmetric about the axis.

A piecewise linear approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis.

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

The curvature of the cone can be constructed such that the surface normal of the cone changes to enable a larger FOR along the Z-axis in Theta Z'. The curvature across the cone adds optical power to the beam, but because the beam is focused to a spot on the cone the effects of power are dwarfed by the change in angle of incidence. This enables the spot-beam to be directed to a larger Theta Z' FOR. Using the tip, tilt and piston capability of the MEMS MMA, this added power can be "canceled out" with an opposite optical power.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) is a three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) is a three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for the fixed mirror (i.e. a polygon base with a curved surface formed by the locus of curved lines from the apex to the perimeter of the polygon base).

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOR. Another alternative is to use the MEMS MMA to vary Theta Z as a function of Phi in order to scan a particular FOR with any conical shape.

Referring now to FIGS. 3 and 4A through 4D, an embodiment of an active situational awareness sensor 60 comprises a housing 62 having four discrete apertures 64 formed about its circumference at 90° (360°/4) intervals. The housing comprises a structural member configured to provide support primarily in the direction parallel to the sensor axis.

A laser 66 is configured to generate a beam 67 of optical radiation that passes through a hole in the center of a parabolic mirror 72 and onto a MEMS MMA 72 at an angle of incidence. MEMS MMA 69 that re-directs beam 67 back onto parabolic mirror 72. Parabolic mirror 72 is oriented to nominally re-direct optical radiation along an optical axis 70 that is oriented in the Z direction. MEMS MMA 69 is responsive to command signals to re-direct the optical radiation onto a particular off-axis section, OAP, of the parabolic mirror 72, which in turn focuses and steers a spot-beam 68 about the optical axis to a location Theta X 74 and Theta Y 76 from the optical axis. Optical element 75 represents a combination of MEMS MMA 69 and parabolic mirror 72 in an unfolded optical system to illustrate the origin of the spot-beam 68 from the optical axis. Theta X is the angle between the projection of the instantaneous location of the axis of the spot-beam on the X-Y plane and the Z-axis and Theta Y is the angle between the instantaneous location of the axis of the spot-beam and the Z-axis such that Theta X is in the plane of the X-axis and Theta Y is in the plane of the Y-axis. Theta Z 78 is the angle between the projection of the instantaneous location of the axis of the steered spot-beam and the Z-axis. Because of the rotational symmetry, the position of the X axis is, more or less, arbitrary.

A controller 80 is configured to issue command signals to the MEMS MMA 72 to steer the spot-beam 68 to the desired Theta X and Theta Y. A computer 82 is configured to issue signals to the controller 80 that provide the desired Theta X and Theta Y to implement a continuous scan, illumination of multiple discrete objects, variable dwell time, compensation for an external signal etc.

A fixed mirror 84 has a conical shape 86 that is oriented along the optical axis 70 in the Z direction. In this particular configuration, conical shape 86 is a normal cone (CN1) that is rotationally symmetric about its axis, which is coincident with the optical axis 70. The tip of the cone is positioned towards the MEMS MMA with the radius of the cone increasing along the axis away from the MEMS MMA. MEMS MMA is suitably configured so that its focus is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Rather than an entire cone, the fixed mirror 84 may have an annular conical shape (a section of the cone) on which the spot-beam is steered. The unused portions of the cone are not necessary.

Four optical channels 90 are positioned between fixed mirror 84 and a different one of the apertures 64 in the housing 62 to guide the redirected spot-beam 68 through the corresponding aperture 64 to a location Phi 91 and Theta Z' 92 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 92 is greater than Theta Z 78. The redirected spot-beam 68 scans a FOR defined by the values of Phi and Theta Z'.

Each optical channel 90 comprises an optic L2 94 and an optic L3 96. Optic L2 is of larger diameter to collect diverging light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture. Note, in certain embodiments a portion of the re-collimation performed by L2/L3 may be done using the MEMS MMA 69, particularly using its piston capability to shape the spot-beam. This reduces some of the optical power requirements of L2/L3, with the potential to eliminate the optics altogether.

Steering spot-beam 68 in a circle (constant Theta Z) around the conical shape scans the redirected spot-beam 68 from one aperture 64 to the next around a 360° FOR in Phi. Varying the radius of the circle scans the redirected spot-beam 68 in a defined FOR in Theta Z'. The angle Theta F 98 of the conical shape 86 of fixed mirror 84 may or may not be configured such that the spot-beam 64 is redirected perpendicular to optical axis 70.

A detector 100, suitably a non-imaging detector, is configured to sense a reflected component of the spot-beam. The reflected component may be processed to provide an intensity of the illuminated object or a range to the illuminated object.

In order to properly form the spot-beam in a small spot on the conical surface of the fixed mirror so that the shape of spot-beam remains consistent (e.g., avoids asymmetrical stretching/compression) as it scans around the mirror, it is critical that the spot-beam is focused onto the conical mirror. If not properly focused, the larger spot projected onto the conical surface will reflect light into a fan, rather than another spot-beam. The off-axis sections of parabolic mirror 72 perform this function in a 2f system. The MEMS MMA 69 may provide additional focusing of the spot-beam to define a smaller or spot or to maintain focus as the beam is steered to different locations of the conical mirror.

Figure 6A:
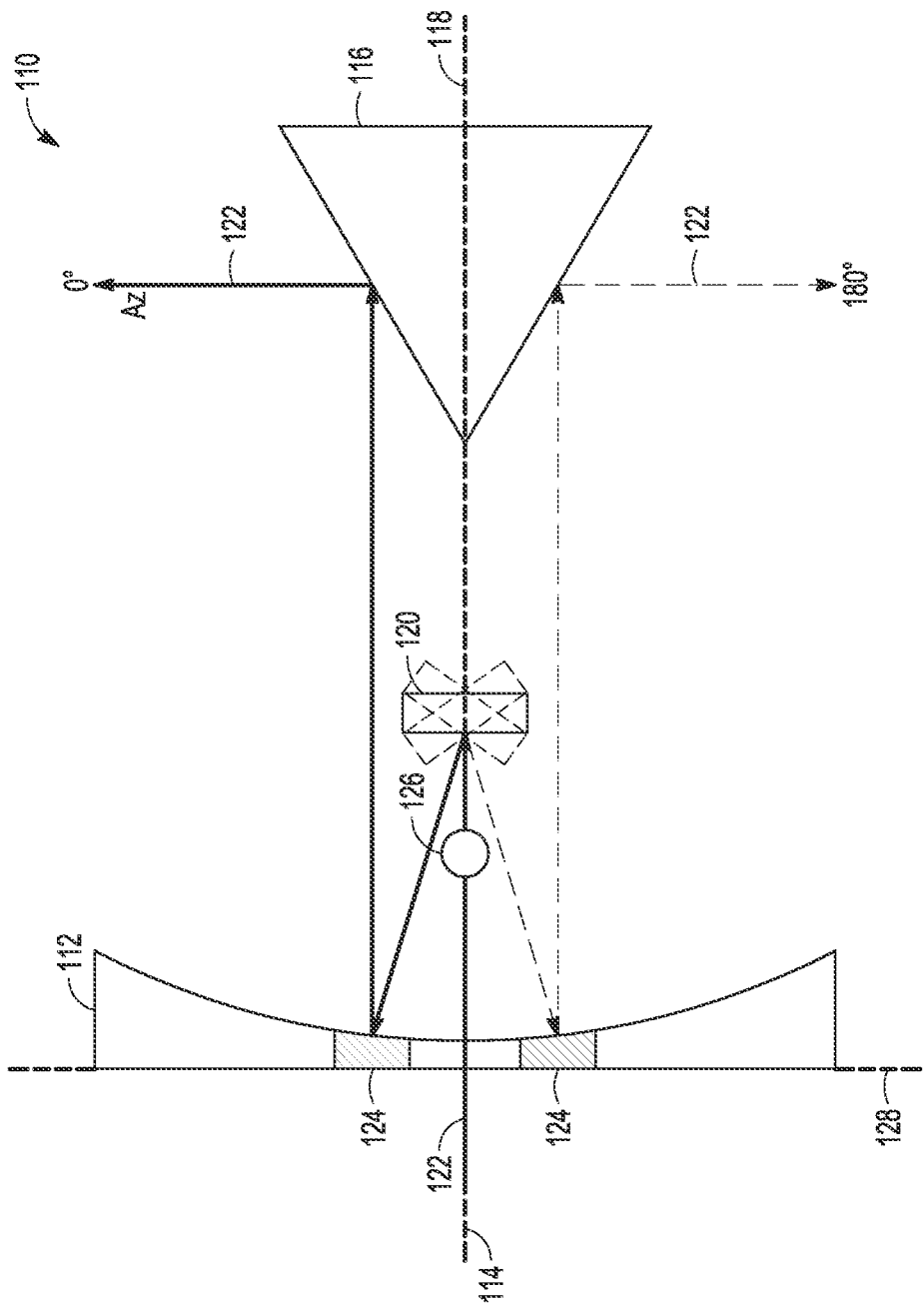
Figure 6B:
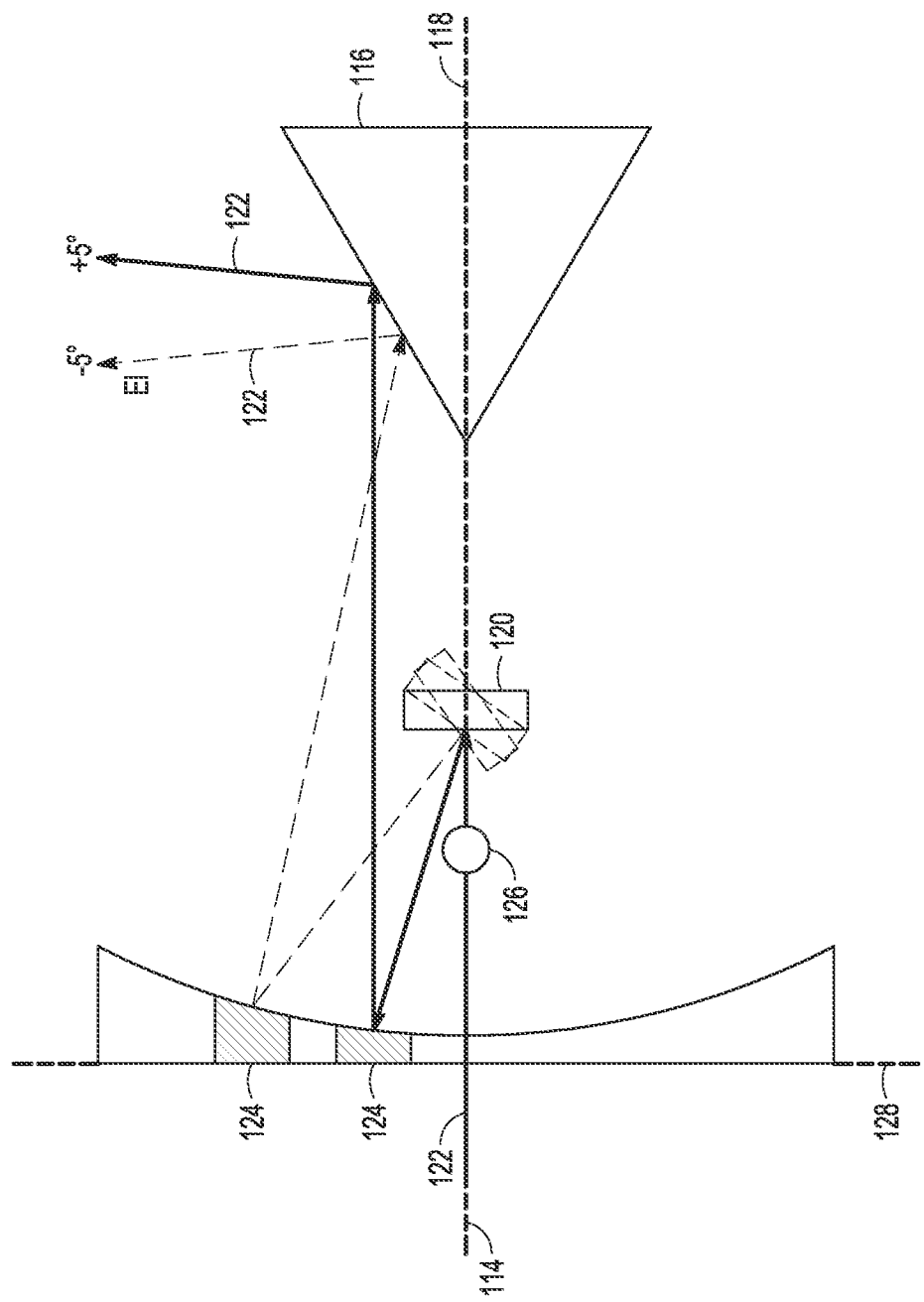

Referring now to FIGS. 6A through 6B, an on-axis embodiment of a beam steerer 110 includes a parabolic mirror 112 having a hole former at its center on an axis of symmetry 114, a fixed mirror 116 having a conic shape whose optical axis 118 is coincident with the parabolic mirror's axis of symmetry 114, and a MEMS MMA 120 positioned between parabolic mirror 112 and fixed mirror 118 on and nominally perpendicular to the axis. For packaging reasons, e.g., to circumvent structure and electronics, a fold mirror(s) may be placed between parabolic mirror 112 and fixed mirror 118. A beam 122 of optical radiation passes through the hole in parabolic mirror 112 to MEMS MMA 120. Responsive to command signals, the MEMS MMA tips and tilts its mirrors to re-direct beam 122 to a particular off-axis section or OAP 124 of parabolic mirror 112, which re-directs and focuses beam 122 onto a specified location on the conic shape of fixed mirror 116, which in turn re-directs beam 122 to a specific location in the FOR. The MEMS MMA may piston the mirrors to provide a small amount of focusing or may tip, tilt and piston the mirrors to add curvature (optical power) to the MMA to provide a larger amount of focusing to supplement the focusing provided by the off-axis section of the parabolic mirror.

A parabola is defined as a set of points that form a curve where any point on the curve is at an equal distance from a fixed point, the "focus" 126, and a straight line, the "directrix" 128. The focus 126 lies on the axis of symmetry 114 perpendicular to the directrix 128. The optical axis 118 of fixed mirror 116 is oriented perpendicular to directrix 128. The focus 126 and the specific OAP 124 of the parabola are selected to re-direct and focus optical radiation into a spot at a specified location on the conical shape of fixed mirror 132. In an embodiment, the optical source is nominally positioned 2 focal lengths away from the OAP 124. Fixed mirror 116 is placed another 2 focal lengths from the OAP. This forms a 2-f focusing system between the laser and fixed mirror. The OAP relays the laser focus onto the conical shape of the fixed. The angles between the laser and fixed mirror determine the specific OAP used to re-direct light toward the optical axis of the fixed mirror. Other optical configurations and specific OAP designs used to focus light into a small spot on the conical shape of the fixed mirror are within the scope of the present invention.

Figure 7:
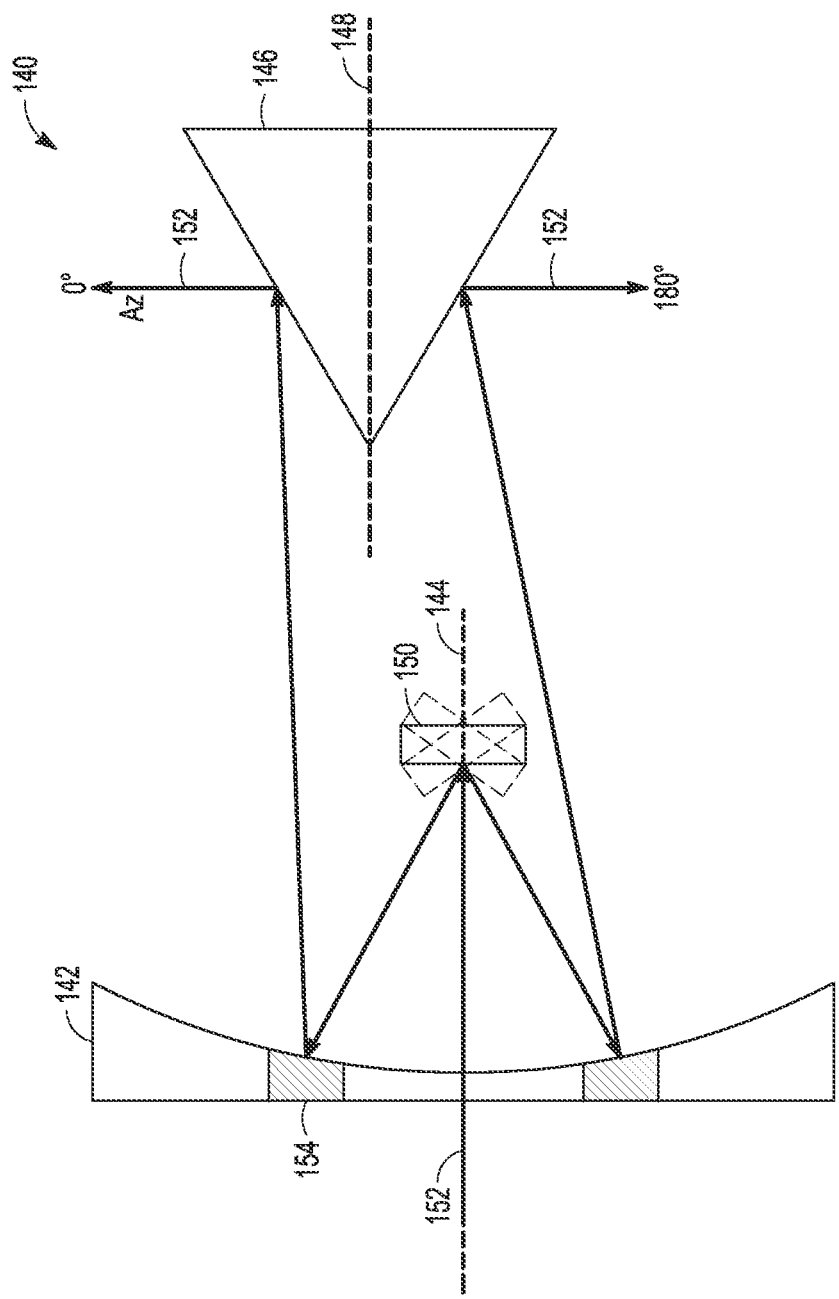
FIG. 7 is an illustration of an off-axis sensor.

Referring now to FIG. 7, an off-axis embodiment of a beam steerer 140 includes a parabolic mirror 142 having a hole former at its center on an axis of symmetry 144, a fixed mirror 146 having a conic shape whose optical axis 148 is offset from the parabolic mirror's axis of symmetry 144, and a MEMS MMA 150 positioned between parabolic mirror 142 and fixed mirror 146 on and suitably tipped up at an angle to the axis to partially compensate for the offset of the fixed mirror. For packaging reasons, a fold mirror(s) may be placed between parabolic mirror 112 and fixed mirror 118. A beam 152 of optical radiation passes through the hole in parabolic mirror 142 to MEMS MMA 150. Responsive to command signals, the MEMS MMA tips and tilts its mirrors to re-direct beam 152 to a particular off-axis section or OAP 154 of parabolic mirror 142, which re-directs and focuses beam 152 onto a specified location on the conic shape of fixed mirror 146, which in turn re-directs beam 152 to a specific location in the FOR. The MEMS MMA may piston the mirrors to provide a small amount of focusing or may tip, tilt and piston the mirrors to add curvature (optical power) to the MMA to provide a larger amount of focusing to supplement the focusing provided by the off-axis section of the parabolic mirror.

In either the on-axis or off-axis embodiments illustrated in FIGS. 6A-6B and 7, the parabolic mirror may be tilted and the axis of the fixed mirror aligned, on-axis or off-axis, to the axis of the parabolic mirror.

Figure 8:
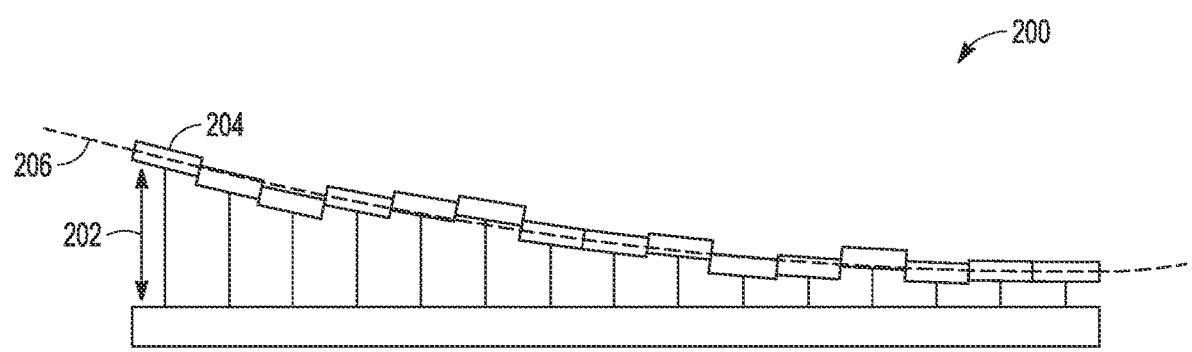
FIG. 8 is an illustration of using the piston capability of the mirrors to shape the spot-beam.

As previously mentioned, the MMA's piston capability can be generally used to "shape" the optical radiation or spot-beam. In addition to focusing and steering the spot-beam, the piston can be used to perform other optical functions on the spot-beam concurrently. As illustrated in FIG. 8, responsive to command signals a MEMS MMA 200 can adjust the piston 202 of mirrors 204 to approximate a continuous surface 206 at a desired angle to reduce diffraction, add curvature (optical power) to assist with focusing the optical radiation into the spot, and deviations from the continuous surface to, for example, compensate for optical distortion or path length variations across the wavefront of the beam. This can be done to compensate for path length variation of the spot-beam (to maintain zero phase across the beam), to correct for atmospheric distortion or both. Adjustments for path length variation can be calibrated offline and stored in a lookup table (LUT) as a function of scan angle. Adjustments for atmospheric distortion are done in real-time during operation of the optical sensor. For wavefront correction, a source emits optical energy in a similar band to illumination e.g., SWIR a beam steerer scans the optical beam onto scene. A wavefront sensor measures the wavefront of the reflected beam to determine the effects of atmospheric distortion. A controller computes the requisite piston adjustments required to correct the wavefront and provides them as command signals to the MEMS MMA. In high quality, high performing optical sensors, the ability to accurately remove the effects of path length variation and atmospheric distortion is critical to achieving useful imagery of the scene, and important features identified within the scene.

Figure 9A:
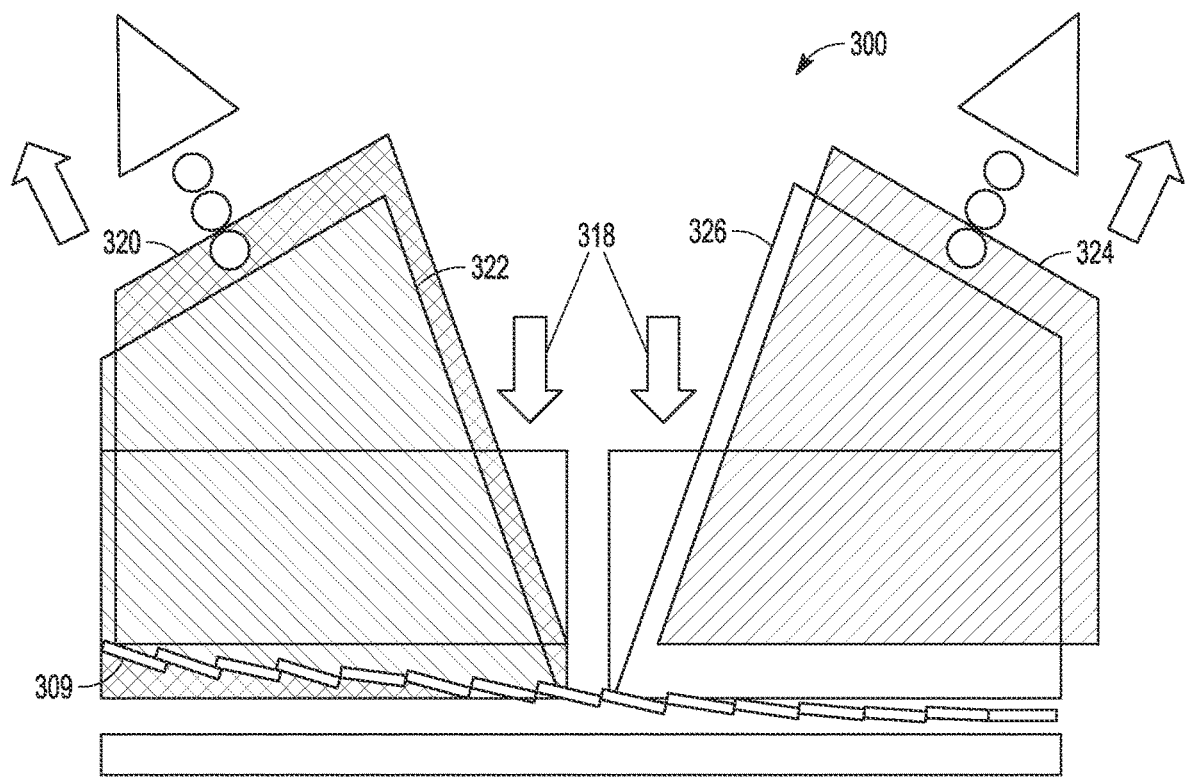
FIGS. 9A-9C are illustrations of partitioning the MEMS MMA into multiple segments to form, focus and steer multiple spot-beams onto the conical surface of the fixed mirror.
Figure 9B:
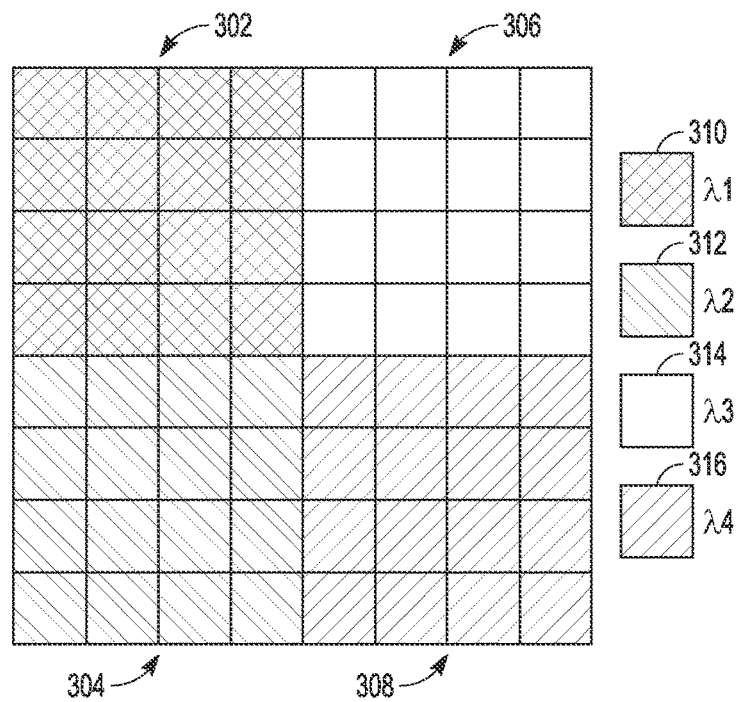
Figure 9C:
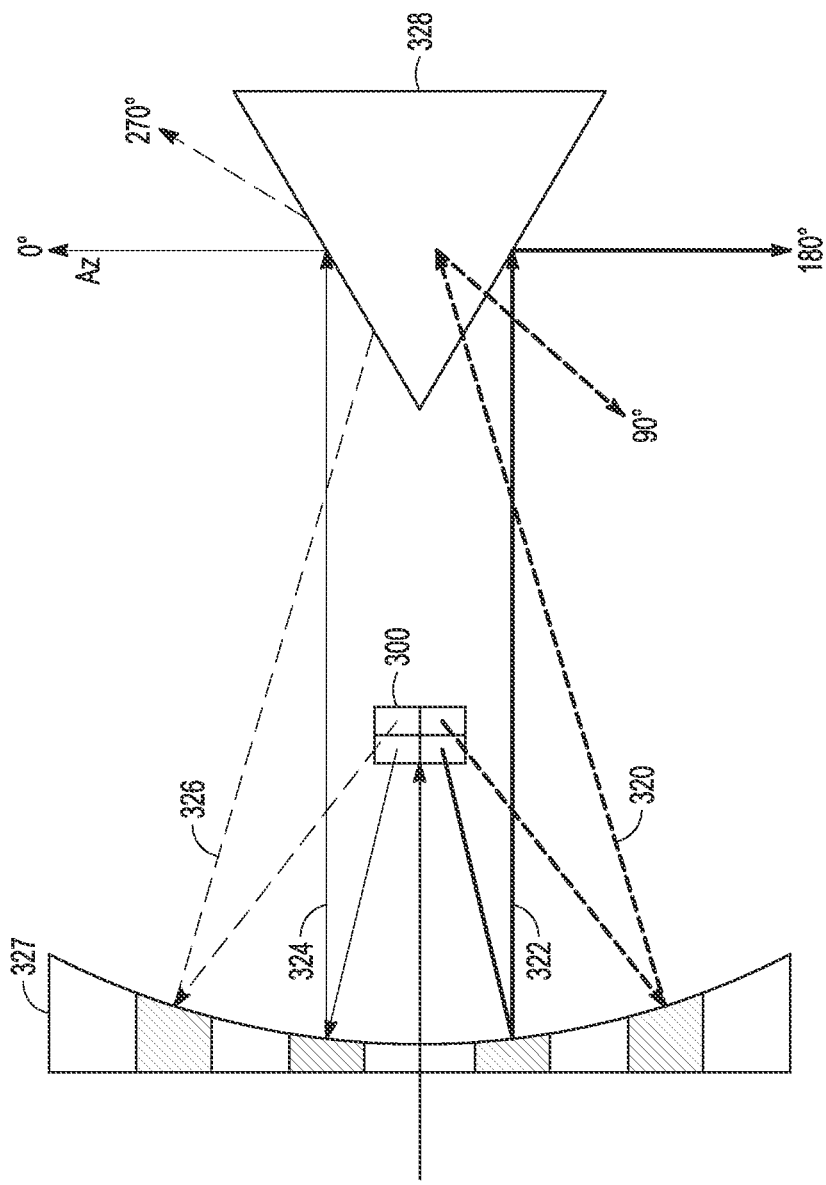

As illustrated in FIGS. 9A-9C, responsive to command signals from the controller, a MEMS MMA 300 is partitioned into four segments 302, 304, 306 and 308 each including a plurality of mirrors 309 illuminated by optical radiation 318. The mirrors in the different sections are provided with reflective coatings 310, 312, 314 and 316 at different wavelengths. In response to command signals, the MEMS MMA tips/tilts/pistons the mirrors in each segment to independently scan optical beams 320, 322, 324 and 326 over different off-axis sections of a parabolic mirror 327, which focuses the beam onto the conical surface of a fixed mirror 328 to scan different portions of a FOR about the optical axis. In an embodiment, one or more beams are used to scan a repetitive pattern in a 360 degree FOR around the optical axis to detect objects and one or more beams are used to scan the locations of the detected objects while the initial 360 degree scan is ongoing. The scans may contain the same or different wavelength compositions. For example, the repetitive scan could be a broad spectral scan and the location specific scans could be narrow spectral scans.

Figure 10A:
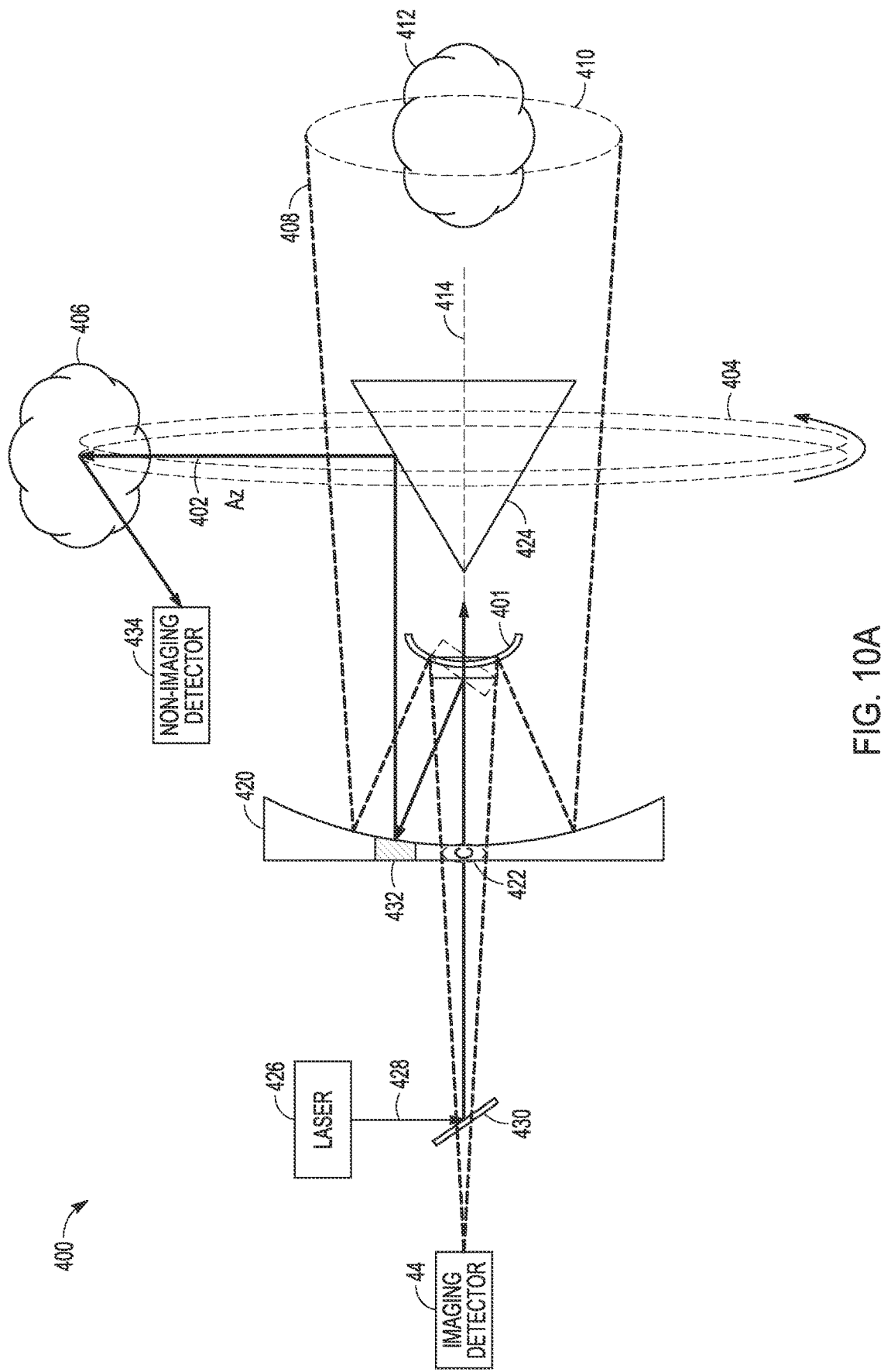
FIGS. 10A-10C are diagrams of an embodiment of a situational awareness sensor and a passive imager that share a MEMS MMA, which functions as the beam steerer and secondary convex mirror.
Figure 10B:
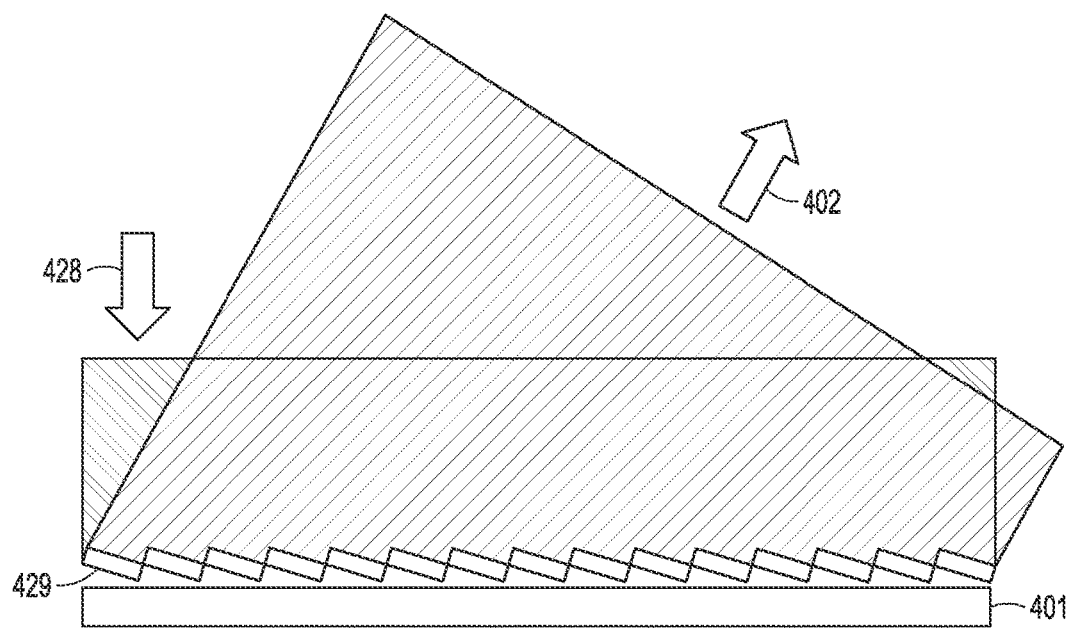
Figure 10C:
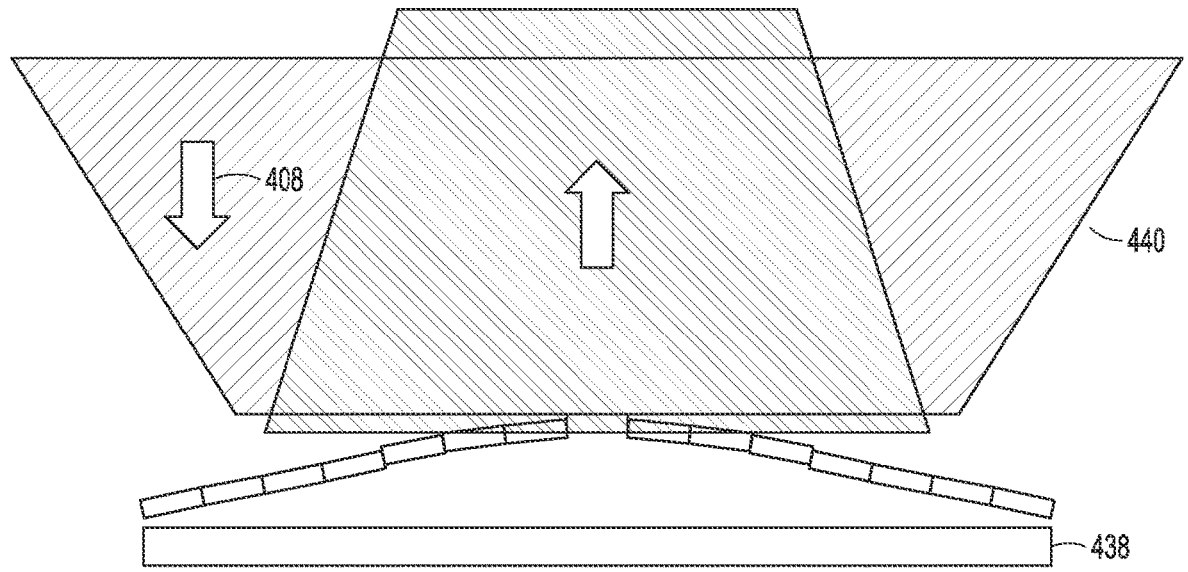

Referring now to FIGS. 10A-10C, an embodiment of a situational awareness sensor 400 can be configured using a MEMS MMA 401 to alternately actively scan a spot-beam 402 over a first FOR 404 of a scene 406 and to passively image optical emissions 408 over a second FOR 410 over a different scene 412 (or different portion of the same scene). Using established nomenclature, the active spot-beam 402 scans FOR 404 in angle Phi around optical axis 414 and angle Theta T along the optical axis. Passive optical emissions 408 are collected in FOR 410 in angle Theta Z around the optical axis. Sensor 400 comprises a parabolic mirror 420 having a hole 422 formed at its center, MEMS MMA 401 and a fixed mirror 424 having a conic shape about optical axis 414.

In a "scanning mode", a laser 426 generate a beam 428 of optical radiation that is re-directed off a fold mirror 430 along the optical axis 414 and passes through hole 422 in the center of a parabolic mirror 420 and onto MEMS MMA 401 that re-directs beam 428 back onto the parabolic mirror. The MEMS MMA is responsive to command signals to tip and tilt, and possibly piston, its mirrors 429 to re-direct the optical radiation onto a particular off-axis section, OPA 432, of the parabolic mirror to focus and steer spot-beam 402 about the optical axis to a location on the conic shape of fixed mirror 424, which in turn scans spot-beam in FOR 404. A non-imaging detector 434 is configured to sense a reflected component 436 of the spot-beam 402 off of scene 406. The reflected component may be processed to provide an intensity of the illuminated object or a range to the illuminated object.

In a "passive imaging mode", passive optical emissions 408 are collected in FOR 410 along optical axis 404 where fixed mirror 424 and MEMS MMA 401 for a central obscuration of the imaging system, obscuring a center portion of FOR 410. The emissions 408 are reflected off of parabolic mirror 420 (e.g. a primary mirror) onto the MEMS MMA, which is responsive to command signals to tip, tilt, piston, its mirrors 429 to form a continuous surface 438 that approximates a discrete convex optical element 440 (e.g. the secondary mirror). Convex optical element 440 re-directs emissions 408 through hole 422 in parabolic mirror 420 onto an imaging detector 442 that generates passive images within FOR 410 of scene 412.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A situational awareness sensor, comprising:
   a parabolic mirror having a hole formed at its center;
   a laser configured to generate a beam of optical radiation that propagates through the hole in the parabolic mirror;
   a fixed mirror having a conical shape oriented along an optical axis;
   a Micro-Electro-Mechanical System (MEMS) Micro-Mirror Array (MMA) positioned to receive the beam, said MEMS MMA comprising one or more independent and continuously controlled mirrors configured to tip and tilt to steer the beam onto different off-axis sections of the parabolic mirror that re-direct and focus the optical radiation into a spot-beam at different locations on the conical shape of the fixed mirror to steer the spot-beam about the optical axis and scan a field-of-regard (FOR) in a first angular direction around the optical axis;

a controller configured to issue command signals to the MEMS MMA to steer the spot-beam; and a detector configured to sense a reflected component of the spot-beam.

2. The situational awareness sensor of claim 1, wherein the optical axis of the fixed mirror is coincident with an axis of symmetry of the parabolic mirror.

3. The situational awareness sensor of claim 1, wherein the mirrors are configured to tip and tilt to scan the spot-beam over the FOR in a second angular direction along the optical axis.

4. The situational awareness sensor of claim 1, wherein the MEMS MMA includes a plurality of mirrors configured to tip, tilt and piston to shape the spot-beam that scans the FOR.

5. The situational awareness sensor of claim 4, wherein each said mirror rotates about X and Y orthogonal axes, respectively, and translates in a Z axis orthogonal to the XY plane to tip, tilt and piston, respectively.

6. The situational awareness sensor of claim 5, wherein each said mirror is supported at three vertices of a triangle, wherein lines defined by three different pairs of said vertices provide three axes at 60 degrees to one another in the XY plane, wherein each said mirror pivots about each said axes to produce tilt, tip and piston in the XYZ space.

7. The situational awareness sensor of claim 4, wherein said mirrors piston to shape the spot-beam to maintain focus on the fixed mirror as the spot-beam is steered to different locations on the conical shape of the fixed mirror.

8. The situational awareness sensor of claim 4, wherein said mirrors tip, tilt and piston to shape the spot-beam to perform one or more of the following:
   adjust a size, divergence or intensity profile of the spot-beam;
   produce deviations in the wavefront of the spot-beam to compensate for atmospheric distortion; and
   adjust the phase and maintain a zero phase difference across the spot-beam.

9. The situational awareness sensor of claim 1, wherein the MEMS MMA is partitioned into a plurality of segments, each segment including a plurality of mirrors, and to tip and tilt the mirrors in each segment to re-direct optical radiation to different off-axis sections of the parabolic mirror to steer a plurality of spot beams onto different locations of the fixed mirror and scan the plurality of spot beams over the FOR.

10. The situational awareness sensor of claim 9, wherein the mirrors in each segment reflect light at different wavelengths such that the optical radiation is re-directed into the plurality of spot-beams at different wavelengths.

11. The situational awareness sensor of claim 9, wherein the MEMS MMA is responsive to command signals to simultaneously steer the plurality of spot-beams over different portions of the FOR.

12. The situational awareness sensor of claim 9, wherein the MEMS MMA is responsive to command signals to simultaneously steer at least one said spot-beam in a repetitive scan pattern around the optical axis in a 360 degree FOR and at least one said spot-beam in a scan pattern to interrogate an object detected in the 360 degree FOR.

13. The situational awareness sensor of claim 1, wherein the optical axis of the fixed mirror is oriented in a Z direction, wherein the MEMS MMA steers the spot-beam about the optical axis to a location Theta X and Theta Y from the optical axis where Theta X is the angle between the projection of the instantaneous location of the axis of the spot-beam on the X-Z plane and the Z axis and Theta Y is the angle between the instantaneous location of the axis of the spot-beam on the Y-Z plane and the Z axis, and Theta Z is the angle between the projection of the instantaneous location of the axis of the steered spot-beam and the Z axis, wherein the fixed mirror redirects the spot-beam to a location Phi and Theta Z' where Phi is the angle between the projection of the instantaneous location of the axis of the redirected spot-beam on the X-Y plane and the X axis and Theta Z' is the angle between the projection of the instantaneous location of the axis of the redirected spot-beam on the Z axis and Theta Z' is greater than Theta Z, wherein the redirected spot-beam scans a field-of-regard (FOR) defined by the values of Phi and Theta Z'.

14. The situational awareness sensor of claim 1, wherein the MEMS MMA comprises a plurality of mirrors configured to tip, tilt and piston, further comprising an imaging detector, wherein in a scanning mode of operation the controller is configured to issue command signals to the laser to generate the beam and the MEMS MMA to tip and tilt the mirrors scan the spot-beam in the FOR, wherein in a passive imaging mode the controller is configured to issue command signals to the MEMS MMA to tip, tilt and piston the mirrors to form a convex mirror that re-directs passive optical emissions collected in a second FOR looking down the optical axis and reflected off the parabolic mirror through the hole in the parabolic mirror to the imaging detector.

15. A situational awareness sensor, comprising:
   a parabolic mirror having a hole formed at its center;
   a laser configured to generate a beam of optical radiation that propagates through the hole in the parabolic mirror;
   a fixed mirror having a conical shape oriented along an optical axis;
   a Micro-Electro-Mechanical System (MEMS) Micro-Mirror Array (MMA) positioned to receive the beam, said MEMS MMA comprising a plurality of independent and continuously controlled mirrors configured to tip and tilt to steer the beam onto different off-axis sections of the parabolic mirror that re-direct and focus the optical radiation into a spot-beam at different locations on the conical shape of the fixed mirror to steer the spot-beam about the optical axis and scan a field-of-regard (FOR) in a first angular direction around the optical axis, said mirrors further configured to piston to shape the spot-beam that scans the FOR;
   a controller configured to issue command signals to the MEMS MMA to steer and shape the spot-beam; and
   a detector configured to sense a reflected component of the spot-beam.

16. The situational awareness sensor of claim 15, wherein each said mirror rotates about X and Y orthogonal axes, respectively, and translates in a Z axis orthogonal to the XY plane to tip, tilt and piston, respectively.

17. The situational awareness sensor of claim 15, wherein said mirrors piston to shape the spot-beam to maintain focus on the fixed mirror as the spot-beam is steered to different locations on the conical shape of the fixed mirror.

18. The situational awareness sensor of claim 15, wherein said mirrors tip, tilt and piston to shape the spot-beam to perform one or more of the following:
   adjust a size, divergence or intensity profile of the spot-beam;
   produce deviations in the wavefront of the spot-beam to compensate for atmospheric distortion; and
   adjust the phase and maintain a zero phase difference across the spot-beam.

19. A situational awareness sensor, comprising:
a parabolic mirror having a hole formed at its center;
a laser configured to generate a beam of optical radiation that propagates through the hole in the parabolic mirror;
a fixed mirror having a conical shape oriented along an optical axis;
a Micro-Electro-Mechanical System (MEMS) Micro-Mirror Array (MMA) positioned to receive the beam, said MEMS MMA comprising a plurality of independent and continuously controlled mirrors configured to tip, tilt and piston;
a non-imaging detector;
an imaging detector;
a controller configured to issue command signals to
implement a scan mode in which the laser is activated to generate the beam and the MEMS MMA tips and tilts the mirrors to steer the beam onto different off-axis sections of the parabolic mirror that re-direct and focus the optical radiation into a spot-beam at different locations on the conical shape of the fixed mirror to steer the spot-beam about the optical axis and scan a first field-of-regard (FOR) in a first angular direction around the optical axis and a second angular direction along the optical axis, wherein a reflected component of the spot-beam is directed to the non-imaging detector;
implement a passive imaging mode in which the MEMS MMA tips, tilts and pistons the mirrors to form a convex mirror that re-directs passive optical emissions collected in a second FOR looking down the optical axis and reflected off the parabolic mirror through the hole in the parabolic mirror to the imaging detector.

20. The situational awareness sensor of claim 1, wherein in the scan mode the controller issues command signals to tip, tilt and piston the mirrors to shape the spot-beam that scans the FOR.

\* \* \* \* \*

UNITED STATES PATENT AND TRADEMARK OFFICE
CERTIFICATE OF CORRECTION

PATENT NO. : 12,025,790 B2  
APPLICATION NO. : 17/177755  
DATED : July 2, 2024  
INVENTOR(S) : Keller et al.

Page 1 of 1

It is certified that error appears in the above-identified patent and that said Letters Patent is hereby corrected as shown below:

In the Specification

In Column 6, Line 38, delete "annuluar" and insert --annular-- therefor

In Column 8, Line 31, delete "38" and insert --35-- therefor

In Column 8, Line 47, delete "X" and insert --X'-- therefor

In Column 10, Line 48, delete "72" and insert --69-- therefor

In Column 11, Line 5, delete "72" and insert --69-- therefor

In Column 11, Line 59, delete "64" and insert --68-- therefor

In Column 14, Line 6, delete "T" and insert --Z'-- therefor

Signed and Sealed this  
Eleventh Day of March, 2025

Coke Morgan Stewart  
*Acting Director of the United States Patent and Trademark Office*